United States Patent
Takahashi (10) Patent No.: US 9,102,472 B2
(45) Date of Patent: Aug. 11, 2015

(54) REPLACEMENT BELT UNIT AND BELT REPLACING METHOD

(71) Applicant: CANON KABUSHIKI KAISHA, Tokyo (JP)

(72) Inventor: Masahiro Takahashi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/899,864

(22) Filed: May 22, 2013

(65) Prior Publication Data

US 2013/0319825 A1 Dec. 5, 2013

(30) Foreign Application Priority Data

Jun. 4, 2012 (JP) ................. 2012-126844

(51) Int. Cl.
*G03G 15/16* (2006.01)
*B65G 15/60* (2006.01)
*G03G 15/20* (2006.01)

(52) U.S. Cl.
CPC ............ *B65G 15/60* (2013.01); *G03G 15/2053* (2013.01); *G03G 2215/2035* (2013.01)

(58) Field of Classification Search
CPC .......... G03G 21/1685; G03G 15/2053; G03G 15/2064; G03G 15/2067
USPC ....................................... 399/122
See application file for complete search history.

(56) References Cited

U.S. PATENT DOCUMENTS

| | | | |
|---|---|---|---|
| 5,149,941 A | 9/1992 | Hirabayashi et al. | |
| 5,300,997 A | 4/1994 | Hirabayashi et al. | |
| 5,343,280 A | 8/1994 | Hirabayashi et al. | |
| 5,525,775 A | 6/1996 | Setoriyama et al. | |
| 5,767,484 A | 6/1998 | Hirabayashi et al. | |
| 6,026,274 A * | 2/2000 | Aslam et al. ................. | 399/329 |
| 7,236,716 B2 | 6/2007 | Ishino et al. | |
| 7,974,563 B2 | 7/2011 | Sakai et al. | |
| 8,005,413 B2 | 8/2011 | Sakakibara et al. | |

(Continued)

FOREIGN PATENT DOCUMENTS

| | | |
|---|---|---|
| CN | 1725119 | 1/2006 |
| CN | 101206434 | 6/2008 |

(Continued)

OTHER PUBLICATIONS

Chinese Office Action dated Mar. 31, 2015, issued in counterpart Chinese Patent Application No. 201310218191.4.

*Primary Examiner* — Walter L Lindsay, Jr.
*Assistant Examiner* — Frederick Wenderoth
(74) *Attorney, Agent, or Firm* — Fitzpatrick, Cella, Harper & Scinto (57) ABSTRACT

A replacement belt unit for use with an image heating apparatus which includes an endless belt for heating an image on a recording material at a nip, a rotatable member for forming the nip between itself and the endless belt and for rotating the endless belt by rotation thereof, and a holding member for holding the endless belt from an inside of the endless belt, includes: a replacement endless belt; a cylindrical member for supporting the replacement endless belt at an inner surface of the replacement endless belt; and an engaging portion provided in a longitudinal end side of the cylindrical member and engageable with the holding member so that the cylindrical member is maintained in a fixed state relative to the holding member when the replacement endless belt is fitted around the holding member.

20 Claims, 6 Drawing Sheets

(56) References Cited

U.S. PATENT DOCUMENTS

| | | |
|---|---|---|
| 8,010,004 B2 | 8/2011 | Tachiki et al. |
| 8,224,223 B2 | 7/2012 | Sakakibara et al. |
| 8,369,763 B2 | 2/2013 | Sakakibara et al. |
| 8,401,450 B2 | 3/2013 | Sekihara et al. |
| 8,971,763 B2 | 3/2015 | Takahashi |
| 2003/0147678 A1* | 8/2003 | Ozawa et al. ............... 399/302 |
| 2006/0018679 A1* | 1/2006 | Ishino et al. ................. 399/94 |
| 2008/0145083 A1* | 6/2008 | Tachiki et al. ................ 399/66 |
| 2010/0086327 A1* | 4/2010 | Hollar et al. ................ 399/110 |
| 2011/0217092 A1 | 9/2011 | Sekihara et al. |
| 2012/0051806 A1 | 3/2012 | Takahashi |
| 2012/0243920 A1* | 9/2012 | Fuchigami et al. ........... 399/329 |
| 2012/0251204 A1 | 10/2012 | Takahashi |
| 2013/0051875 A1 | 2/2013 | Takahashi |
| 2013/0202334 A1 | 8/2013 | Takahashi |
| 2013/0330103 A1 | 12/2013 | Takahashi |

FOREIGN PATENT DOCUMENTS

| | | |
|---|---|---|
| JP | 63-313182 A | 12/1988 |
| JP | 2-157878 A | 6/1990 |
| JP | 4-44075 A | 2/1992 |
| JP | 4-204980 A | 7/1992 |

* cited by examiner

REPLACEMENT BELT UNIT AND BELT REPLACING METHOD

FIELD OF THE INVENTION AND RELATED ART

The present invention relates to a replacement belt unit for use with an image heating apparatus and relates to a belt replacing method for the image heating apparatus. The image heating apparatus is usable in a copying machine, a printer, a facsimile machine or a multi-function machine having functions of these machines. Specifically, as the image heating apparatus, it is possible to use a fixing device (apparatus) for fixing an image on a recording material and a glossiness improving device (apparatus) for improving glossiness of the image by heating the image fixed on the recording material.

Heretofore, in an image forming apparatus using an electrophotographic process, an image (toner image) is formed on the recording material and thereafter is fixed on the recording material by being heated and pressed in the fixing device (image heating apparatus).

In recent years, from viewpoints of a quick start property and an energy saving property, fixing devices using a low thermal capacity fixing belt (endless belt) as described in Japanese Laid-Open Patent Application (JP-A) Sho 63-313182, JP-A Hei 2-157878, JP-A Hei 4-44075 and JP-A Hei 4-204980 have been proposed and put into practical use.

Specifically, a nip is formed by sandwiching the fixing belt between, e.g., a ceramic heater as a heating source and a pressing roller (rotatable member). Then, the recording material on which the image is formed is guided into the nip, and then the image is fixed on the recording material surface by pressure at the nip while applying heat from the ceramic heater to the image via the fixing belt.

In such a fixing device using the fixing belt, in the case where the fixing belt is replaced, when the fixing belt is a thin cylinder and a force is exerted in a direction in which the cylinder is crushed, the belt locally causes buckling and is deteriorated, and therefore the fixing belt is not replaced alone. That is, in a conventional constitution, in the case where a replacing operation of the fixing belt as a replacement part is performed, a belt unit in a state in which the fixing belt is mounted, or the entire fixing device is replaced.

However, it is desired that the fixing belt is made enable to be replaced alone. In this case, it is required that the replacement is facilitated while suppressing the deterioration of the fixing belt.

SUMMARY OF THE INVENTION

A principal object of the present invention is to provide a replacement belt unit capable of facilitating replacement of an endless belt.

Another object of the present invention is to provide a belt replacing method capable of facilitating replacement of the endless belt.

According to an aspect of the present invention, there is provided a replacement belt unit for use with an image heating apparatus which includes an endless belt for heating an image on a recording material at a nip, a rotatable member for forming the nip between itself and the endless belt and for rotating the endless belt by rotation thereof, and a holding member for holding the endless belt from an inside of the endless belt, the replacement belt unit comprising: a cylindrical member for supporting a replacement endless belt at an inner surface of the replacement endless belt; and an engaging portion provided in a longitudinal end side of the cylindrical member and engageable with the holding member so that the cylindrical member is maintained in a fixed state relative to the holding member when the replacement endless belt is fitted around the holding member.

According to another aspect of the present invention, there is provided a belt replacing method for an image heating apparatus which includes an endless belt for heating an image on a recording material at a nip, a rotatable member for forming the nip between itself and the endless belt and for rotating the endless belt by rotation thereof, and a holding member for holding the endless belt from an inside of the endless belt, the belt replacing method comprising: a step of pulling out the endless belt from the holding member; a step of engaging a replacement belt unit with the holding member; a step of sliding a replacement endless belt toward the holding member; and a step of disengaging the replacement belt unit from the holding member.

According to another aspect of the present invention, there is provided a replacement belt unit for use with an image heating apparatus which includes an endless belt for heating an image on a recording material at a nip, a rotatable member for forming the nip between itself and the endless belt and for rotating the endless belt by rotation thereof, and a guiding member for guiding rotational movement of the endless belt from an inside of the endless belt, the replacement belt unit comprising: a cylindrical member for supporting a replacement endless belt at an inner surface of the replacement endless belt; and an engaging portion provided in a longitudinal end side of the cylindrical member and engageable with the guiding member so that the cylindrical member is maintained in a fixed state relative to the guiding member when the replacement endless belt is fitted around the guiding member.

According to a further aspect of the present invention, there is provided a belt replacing method for an image heating apparatus which includes an endless belt for heating an image on a recording material at a nip, a rotatable member for forming the nip between itself and the endless belt and for rotating the endless belt by rotation thereof, and a guiding member for guiding rotation of the endless belt from an inside of the endless belt, the belt replacing method comprising: a step of pulling out the endless belt from the guiding member; a step of engaging a replacement belt unit with the guiding member; a step of sliding an replacement endless belt toward the guiding member; and a step of disengaging the replacement belt unit from the guiding member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

Parts (a) and (b) of FIG. 1 are perspective views for illustrating a fixing belt mounting method according to First Embodiment of the present invention, in which (a) shows a state in which a connecting portion provided at a longitudinal end portion of a core as an endless replacement belt unit is connected with an end portion-side member of a fixing device, and (b) shows a state the fixing belt is displaced in a longitudinal direction via the connecting portion by using a limiting member placed in a demounted state.

Parts (a) and (b) of FIG. 5 are perspective views of the fixing device in First Embodiment, in which (a) shows the limiting member in a mounted state, and (b) shows the limiting member in the demounted state.

Parts (a) and (b) of FIG. 6 are sectional views for illustrating engagement between the core and the limiting member in First Embodiment, in which (a) shows the mounted state of a detachably mountable limiting member, and (b) shows the demounted state of the detachably mountable limiting member.

DESCRIPTION OF THE PREFERRED EMBODIMENTS

Hereinbelow, embodiments of the present invention will be described specifically with reference to the drawings.

First Embodiment

Image Forming Apparatus

An image forming apparatus in which a fixing device as an image heating apparatus in this embodiment of the present invention will be described with reference to FIG. 7.

Figure 7:
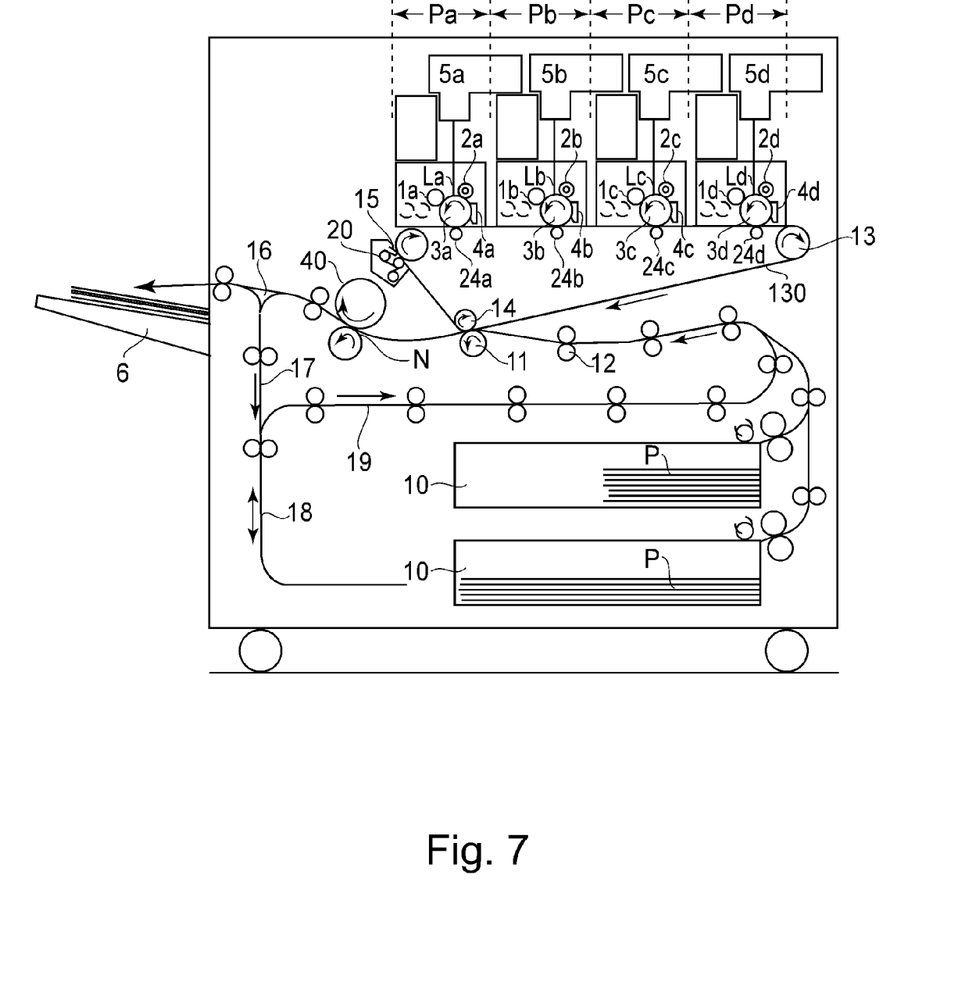
FIG. 7 is a sectional view of an image forming apparatus in which an image heating apparatus in First Embodiment is mounted.

In the image forming apparatus shown in FIG. 7, first to fourth image forming portions Pa, Pb, Pc and Pd are juxtaposed and toner images of different colors are formed through a process including latent image formation, development and transfer.

The image forming portions Pa, Pb, Pc and Pd include dedicated image bearing members, i.e., electrophotographic photosensitive drums $3a$, $3b$, $3c$ and $3d$, respectively, in this embodiment, and on each of the drums $3a$, $3b$, $3c$ and $3d$, an associated color toner image is formed. Adjacently to the respective drums $3a$, $3b$, $3c$ and $3d$, an intermediary transfer member 130 is provided. The respective color toner images formed on the drums $3a$, $3b$, $3c$ and $3d$ are primary-transferred onto the intermediary transfer member 130 and then are transferred onto a recording material P at a secondary transfer portion. Further, the recording material P on which the toner images are transferred is subjected to fixing of the toner images by a fixing device 40 under heat and pressure and thereafter is discharged, to the outside of the image forming apparatus, as a recording image-formed product.

At peripheries of the drums $3a$, $3b$, $3c$ and $3d$, drum chargers $2a$, $2b$, $2c$ and $2d$, developing devices $1a$, $1b$, $1c$ and $1d$, primary transfer chargers $24a$, $24b$, $24c$ and $24d$ and cleaners $4a$, $4b$, $4c$ and $4d$ are provided. Further, at an upper portion in the image forming apparatus, laser scanners $5a$, $5b$, $5c$ and $5d$ are provided.

Laser light emitted from each of the laser scanners $5a$ to $5d$ is used to scan the surface of an associated drum by rotation of an associated polygon mirror and then fluxes of the scanning light is deflected by an associated reflection mirror.

Then, the light fluxes are focused on generating lines of the photosensitive drums $3a$ to $3d$ by fθ lenses to expose the photosensitive drums to light, so that latent images depending on image signals are formed on the photosensitive drums $3a$ to $3d$.

In the developing devices $1a$, $1b$, $1c$ and $1d$, as developers, toners is cyan, magenta, yellow and black, respectively, are filled in a predetermined amount by unshown supplying devices. The developing devices $1a$, $1b$, $1c$ and $1d$ develop the latent images on the photosensitive drums $3a$, $3b$, $3c$ and $3d$, respectively, to visualize the latent images as a cyan toner image, a magenta toner image, a yellow toner image and a black toner image, respectively.

The intermediary transfer member 130 is rotationally driven in a direction indicated by an arrow at the same peripheral speed as those of the photosensitive drums $3a$, $3b$, $3c$ and $3d$. The cyan toner image for a first color formed and carried on the photosensitive drum $3a$ is intermediary-transferred onto an outer peripheral surface of the intermediary transfer member 130 by pressure and an electric field formed by a primary transfer bias applied to the intermediary transfer member 130 in a process in which the cyan toner image passes through a nip between the photosensitive drum $3a$ and the intermediary transfer member 130.

Then, similarly as in the case of the cyan toner image for the first color, a magenta toner image for a second color, a yellow toner image for a third color and a black toner image for a fourth color are successively transferred superposedly onto the intermediary transfer member 130, so that the synthetic color toner image corresponding to an objective color image is formed.

Transfer residual toners on the photosensitive drums $3a$, $3b$, $3c$ and $3d$ for which the primary transfer is ended are removed from the drums by the cleaners $4a$, $4b$, $4c$ and $4d$, respectively, and then the photosensitive drums $3a$, $3b$, $3c$ and $3d$ prepare for subsequent latent image formation. Foreign matters such as toner and the like which remain on the intermediary transfer member 130 are wiped with a cleaning web (nonwoven fabric) 20 by bringing the cleaning web 20 into contact with the surface of the intermediary transfer member 130.

A secondary transfer roller 11 is press-contacted to the intermediary transfer member 130 toward a roller 14 of three rollers 12, 13 and 14 around which the intermediary transfer member 130 is extended and stretched, so that a secondary transfer nip is formed between the secondary transfer roller 11 and the intermediary transfer member 130. To the secondary transfer roller 11, a desired secondary transfer bias is applied by a secondary transfer bias (voltage) source. The synthetic color toner image including the four color toner images superposedly transferred on the intermediary transfer member 130 is transferred onto the recording material (sheet) P in the following manner.

That is, the recording material P is fed at predetermined timing so that the recording material P is fed from a sheet feeding cassette 10 to the contact nip between the intermediary transfer member 130 and the secondary transfer roller 11 after passing through a registration roller 12 and a front transfer guide, and concurrently the secondary transfer bias is applied from the bias voltage source to the secondary transfer roller 11. By the secondary transfer bias, the synthetic color toner image is transferred from the intermediary transfer member 130 onto the recording material P. The recording material P on which the toner image is transferred is successively introduced into a fixing nip N of the fixing device 40, in which heat and pressure are applied to the recording material P and thus the toner image is fixed on the recording material P.

In the case where a double-side copying mode is selected, the recording material P on which the image has already been formed in a first surface side and which comes out of the fixing device 40 is introduced into a sheet path 17 in a re-circulating conveying mechanism side by a flapper 16, and then enters a switch-back sheet path 18. Thereafter the recording material P is pulled out and conveyed from the sheet path 18 to be introduced into a conveying path 19 for re-conveyance. Then, the recording material P is re-introduced at predetermined timing into the secondary transfer nip, as the contact nip between the intermediary transfer member 130 and the secondary transfer roller 11, in a state in which the first surface of the recording material P is turned upside down, after passing through the sheet path 19, the registration roller 12 and the front transfer guide.

As a result, on a second surface of the recording material P, the toner image is secondary-transferred from the intermediary transfer member 130. The recording material P on which the toner image is secondary-transferred on its second surface at the secondary transfer nip is separated from the intermediary transfer member 130 and then is re-introduced into the fixing device 40, so that the toner image is fixed on the second surface of the recording material P and then the recording material P is discharged, as a both-side-copied product, onto a sheet discharge tray 6 provided outside the image forming apparatus.

Fixing Device

1) General Structure

The fixing device in this embodiment employs a constitution (so-called free belt type) in which a thin fixing belt having low thermal capacity is used and is driven by the pressing roller (i.e., rotated by the rotation of the pressing roller), and therefore in the constitution, a rising process can be performed in a short time.

Figure 4:
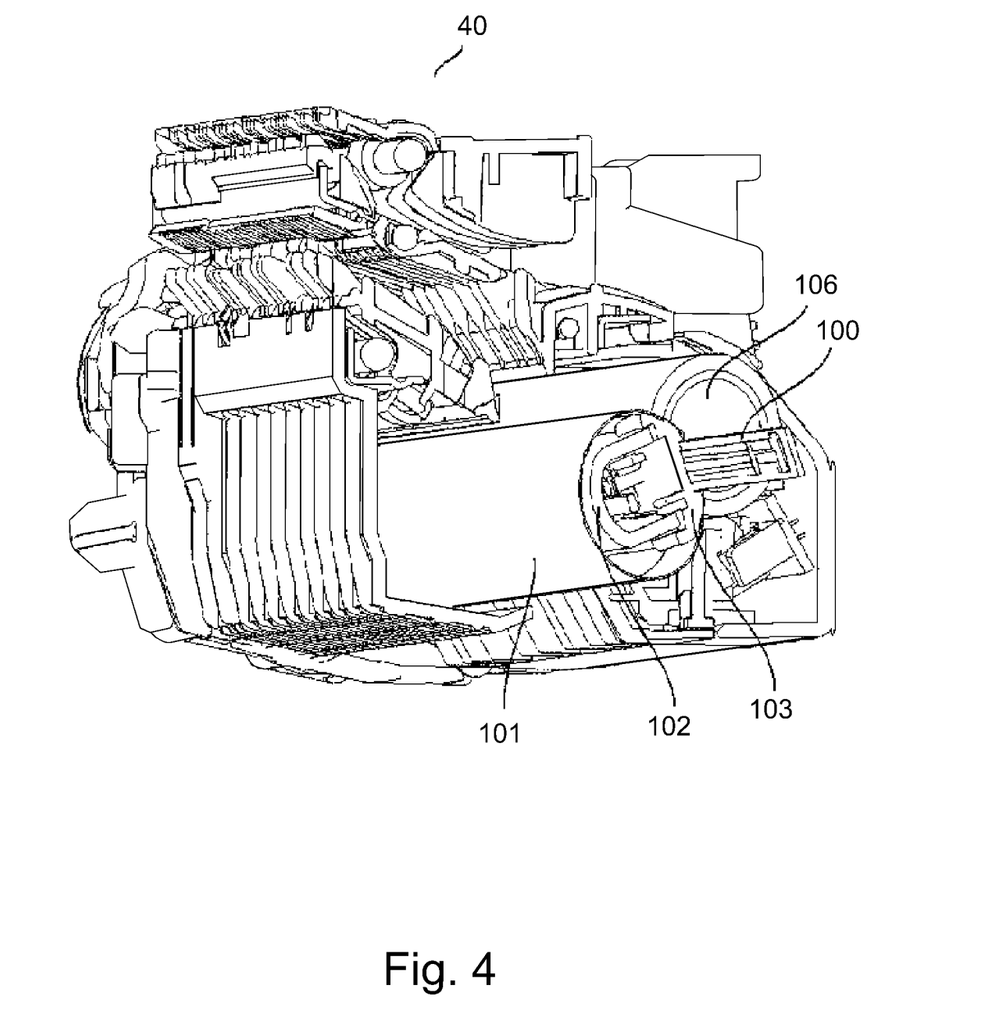
FIG. 4 is a perspective view of the fixing device in First Embodiment.

In FIG. 4, the fixing device 40 as the image heating apparatus includes a ceramic heater 100 as an elongated heating mechanism and includes a cylindrical fixing belt 101 as an endless belt to be rotationally moved in a conveyance direction (crossing a longitudinal direction of the heater 100) of the recording material on which the image is carried. The fixing device 40 further includes a pressing roller 106 as a pressing member (rotatable member), a heater holder 103 for forming the nip N between the fixing belt 101 and the pressing roller 106 opposing the heater holder 103, and a stay 102 provided inside the fixing belt 101 in order to ensure strength of the heater holder 103. That is, in this embodiment, the heater 100, the heater holder 103, the stay 102 and a rotation locus limiting member 104 function as a holding member (guiding member) for holding (guiding) the fixing belt 101 from the inside of the fixing belt 101.

As a result, the recording material carrying the image is nipped and conveyed by the rotationally driven pressing roller 106 and the fixing belt 101 rotated by the rotational drive of the pressing roller 106, so that an unfixed toner image on the recording material is heated.

Figure 5:
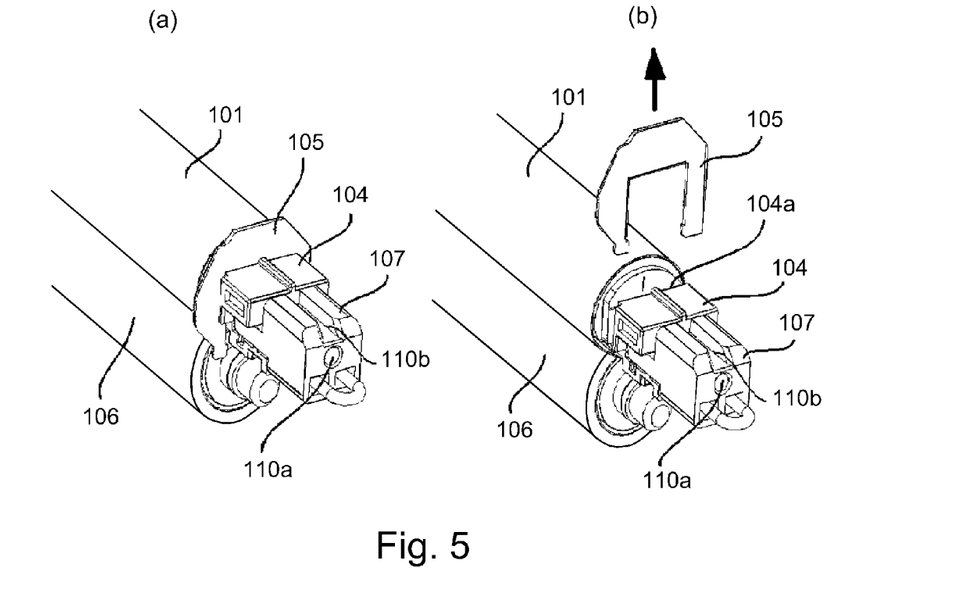

Further, as shown in FIG. 5, a limiting member (flange-like portion) 105 for limiting (regulating) displacement of the fixing belt 101 in a longitudinal direction (thrust direction) crossing a conveyance direction is mounted so that its projections are engaged with a groove 104a provided on the rotation locus limiting member 104. Here, the limiting member 105 is constituted so that it is demountable from (detachably mountable to) the fixing belt 101 so as to be switched between a first state (mounted state) in which the limiting member 105 limits the displacement of the fixing belt 101 in the longitudinal direction and a second state (demounted state) in which the limitation is eliminated (released). Part (a) of FIG. 5 shows the limiting member 105 in the mounted state, and (b) of FIG. 5 shows the limiting member 105 in the demounted state changed from the mounted state.

With respect to the limiting member 105, in a further longitudinal end side, in addition to the rotation locus limiting member 104 as an end portion-side member, a connector 107 as an electric power supplying member for supplying electric power to the ceramic heater 100 is provided. On the connector 107 and the rotation locus limiting member 104, portions-to-be-engaged 110a and 110b for being engaged with the core as the endless replacement belt unit described later are provided. In this embodiment, the fixing device and the replacement belt unit are in combination referred to as a belt replacing system.

2) Fixing Belt

The fixing belt 101 is an endless belt, having a cylindrical shape and heat resistance, as a heat-generating member for transmitting heat to the recording material P, and is fitted loosely around the guiding member 103. The fixing belt 101 is prepared by coating a silicone rubber layer (elastic layer) and a PFA resin tube on a metal film (base layer) formed in a seamless belt shape having a thickness of about 0.04 mm. Or, the fixing belt 101 is prepared by coating the silicone rubber layer (elastic layer) and the PFA resin tube on an about 0.1 mm-thick film (base layer) formed of a heat-resistant resin material, such as polyimide, in the seamless belt shape.

3) Back-Up Member (Holding Member)

In FIG. 4, as a back-up member (holding member) for holding the fixing belt 101 from the inside of the fixing belt 101, in addition to the heater holder 103 and the stay 102, the rotation locus limiting member 104 and the connect 107 are further provided. The heater holder 103 includes a recessed portion as a part thereof, and in this recessed portion, the ceramic heater 100 is engaged. That is, the heat holder 103 effects positioning and holding of the ceramic heater 100 and concurrently when it is urged toward the pressing roller 106, the ceramic heater 100 and the heater holder 103 are urged together toward the pressing roller 106 to form the nip N.

The ceramic heater 100 includes an electrode portion for being supplied with the electric power at each of its ends, and the connector 107 is connected with the electrode portion, so that the ceramic heater 100 is made heatable. Incidentally, in FIG. 2, a folded wiring portion 108 is provided.

4) Replacement Belt Unit

Next, with reference to FIG. 3, the replacement belt unit in this embodiment will be described. The replacement belt unit has a constitution including a core 300 as a cylindrical member and the fixing belt 101 as a new replacement endless belt. Details will be described below.

When the fixing belt 101 is physically distributed alone, as a packing form, the fixing belt 101 is placed in a state in which a hollow cylindrical core 300 to be protruded from longitudinal ends of the fixing belt 101 is inserted into the fixing belt 101, at an outer configuration portion of the core 300, i.e., at an outer peripheral surface of the core 300, at least three ribs 301 are provided along the longitudinal direction at different positions with respect to a circumferential direction, and a diameter of a phantom circle contacting a rib end is set so as to be substantially equal to (slightly smaller than) an inner diameter of the fixing belt 101.

For this reason, the fixing belt 101 and the core 300 are supported only by line contact with the rib end. Further, the core 300 functions as a maintaining member for maintaining a shape of the replacement fixing belt by supporting the replacement fixing belt from an inner surface of the replacement fixing belt. As a result, when the replacement fixing belt is inserted into a film unit 41, it becomes possible to decrease a sliding resistance of the fixing belt 101 against the core 300. This is because an area where the fixing belt 101 contacts the core 300 is small. Further, onto the surface of the fixing belt 101, a protective sheet 302 is wound, thus preventing contamination of the surface of the fixing belt 101.

Figure 6:
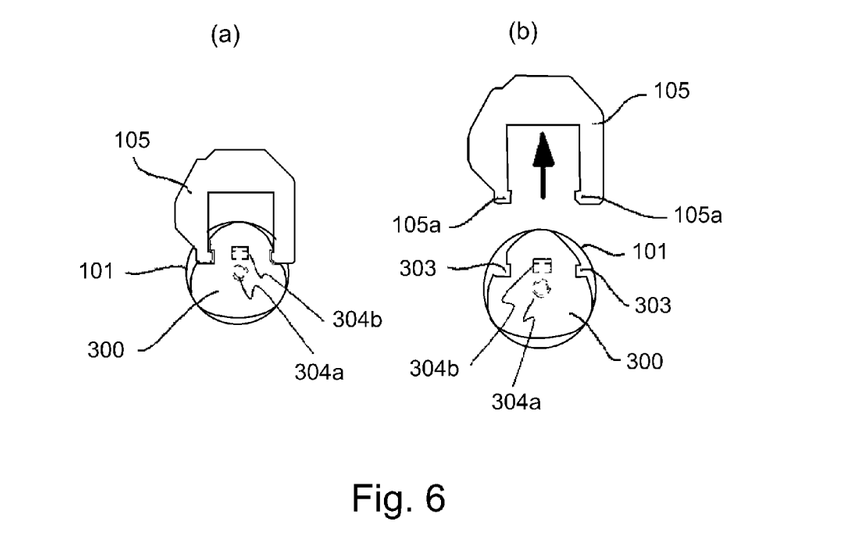

On the core 300, an engaging groove 303 which is to be engaged with the limiting member 105 demounted from the holding member (guiding member) for holding the fixing belt from the inside of the fixing belt and which is a guiding portion for guiding sliding movement of the limiting member 105 along the longitudinal direction of the core 300 is provided. As shown in FIG. 6, with the engaging grooves 303 provided on the core 300, projections (portions-to-be-guided) 105a on the limiting member 105 are engaged, so that the position of the limiting member 105 with respect to a radial direction of the core 300 is limited and the limiting member 105 becomes slidable in the longitudinal direction of the core 300 by the engaging grooves 303.

Figure 3:
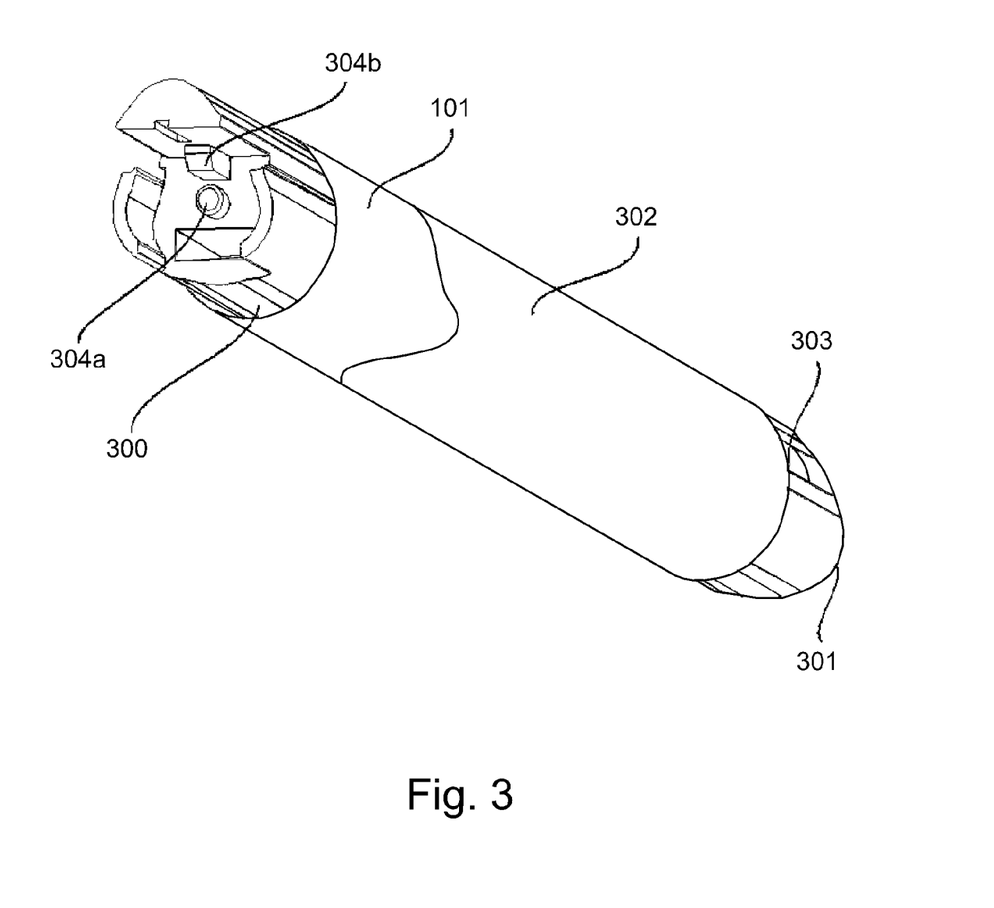
FIG. 3 is a perspective view of the fixing belt in a packing state in First Embodiment.

Further, as shown in FIG. 3, at a longitudinal end portion of the core 300, engaging portions 304a and 304b to be engaged with the connector 107 functioning as the holding member (guiding member) and the rotation locus limiting member 104 in a phase-aligned state are provided. The engaging portions 304a and 304b are engaged with the portions-to-be-engaged 110a and 110b, respectively, so that phases and positions of the core 300 and the replacement belt unit are uniquely determined.

Thus, the engaging portions 304a and 304b are provided in the longitudinal (widthwise) end side of the core 300, so that the core 300 is engageable with the holding member provided with the portions-to-be-engaged 110a and 110b. Further, these engaging portions 304a and 304b perform, when the replacement endless belt is moved in the longitudinal direction (widthwise direction) relative to the core 300 in order to be fitted around the holding member, a function of maintaining a state in which the core 300 is fixed to the holding member.

Fixing Belt Replacing Method

Figure 2:
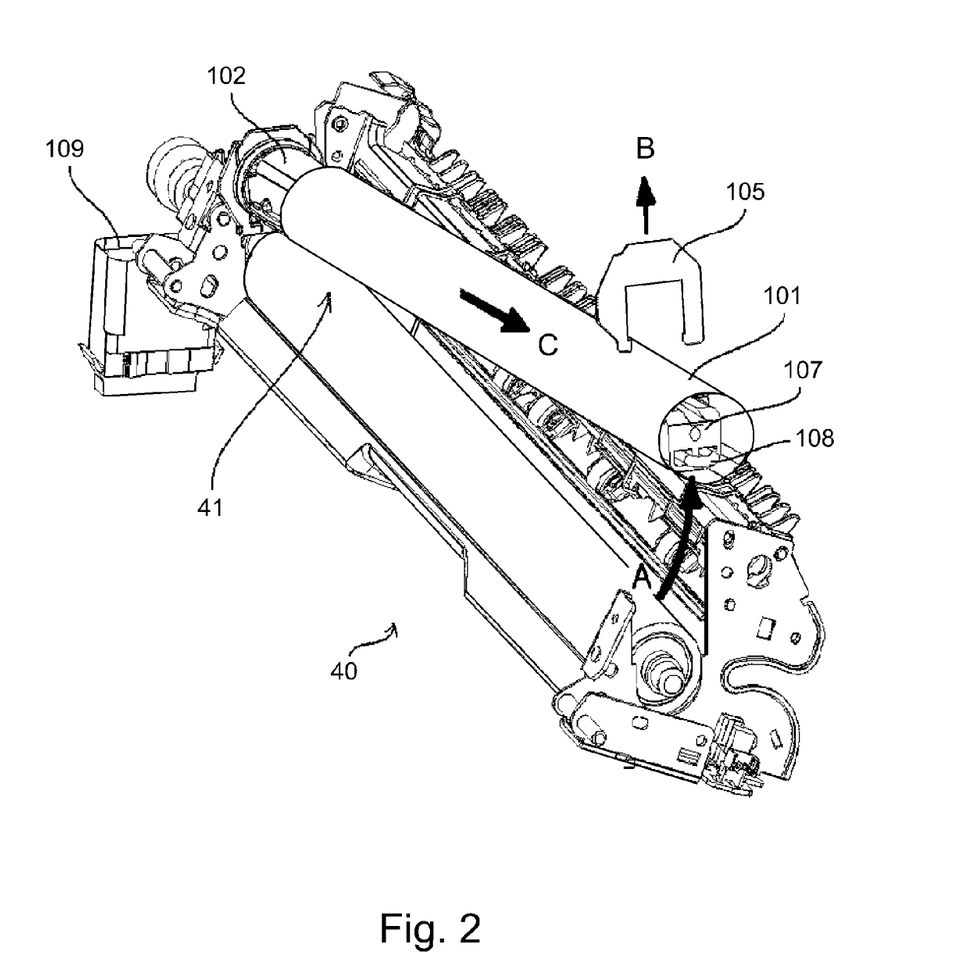
FIG. 2 is a perspective view showing a demounting method of the fixing belt in First Embodiment.

Next, a fixing belt replacing operation in the fixing device in this embodiment will be specifically described with reference to FIG. 2. First, a demounting procedure (step) of the fixing belt 101 from the fixing unit 40 will be described with reference to FIG. 2.

First of all, when the fixing belt 101 is demounted from the fixing device, the belt unit 41 is partly spaced upward from the fixing unit 40. That is, the film unit 41 is inclined about the longitudinal end side thereof so as to be moved away from the pressing roller 106 in another longitudinal end side thereof.

Then, the limiting member 105 is demounted from the rotation locus limiting member 104 in an arrow B direction, thus being placed in the demounted state (second state). Thereafter, the fixing belt 101 which is used and to be replaced is slid and moved in an arrow C direction, thus being demounted.

Figure 1:
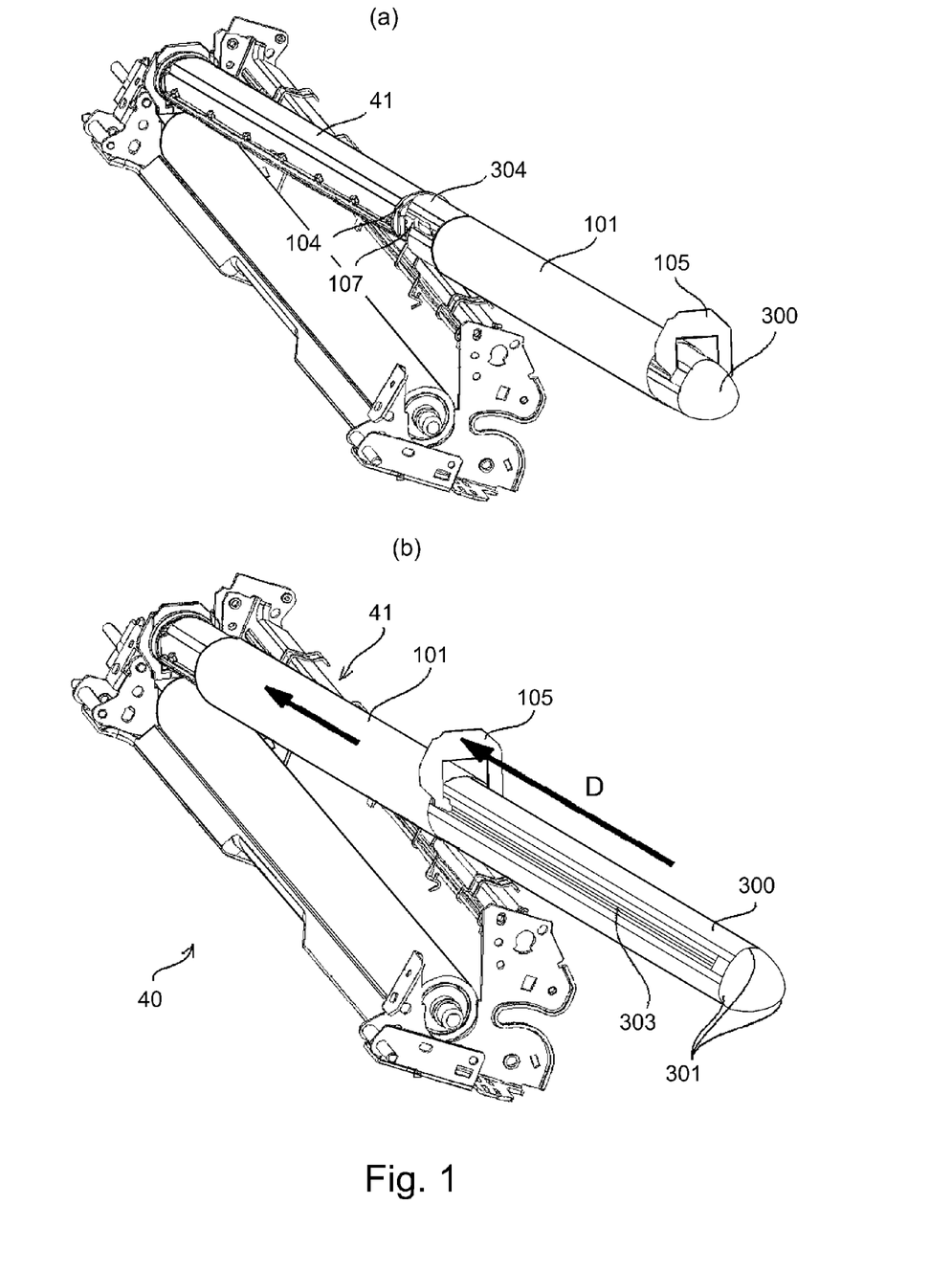

Next, with reference to FIG. 1, a mounting procedure (step) of the new fixing belt 101 on the fixing unit 40. As shown in (a) of FIG. 1, on the core 300, the new fixing belt 101 is fitted around the outer peripheral surface of the core 300. Then, the engaging portion (specifically the engaging portions 304a and 304b in FIG. 3) is engaged with the portions-to-be-engaged 110a and 110b ((b) of FIG. 5) provided on the connector 107 and the rotation locus limiting member 104. As a result, the belt unit 41 and the core 300 are connected with each other and thus are integrally assembled.

At this time, the engaging portion 304 of the core 300 forms a connecting portion so as to surround projections and recesses of the connector 107 and the rotation locus limiting member 104. As a result, an end portion of the fixing belt 101 is prevented from being caught by the connector 107 and the rotation locus limiting member 104.

From this state, as shown in (a) of FIG. 1, the limiting member 105 placed in the demounted state (second state) in which the limiting member 105 has been demounted in advance is engaged and mounted in another end side of the core 300 opposite from the end side where the engaging portion 304 is provided. Then, as shown in (b) of FIG. 1, the limiting member 105 is slid and moved in the longitudinal direction (arrow D direction) of the core 300.

The limiting member 105 slid and moved in the longitudinal direction of the core 300 pushes a rear end portion (a longitudinal end portion) of the new fixing belt 101, thus moving the fixing belt 101 in the longitudinal direction. As a result, the fixing belt 101 is fitted around the above-described holding member and thus is mounted on the belt unit 41 so as to surround the belt unit 41. Thus, the limiting member 105 placed in the demounted state (second state) is used also as a member for sliding the replacement endless belt at one end of the replacement endless belt with respect to the longitudinal direction (widthwise direction).

After the fixing belt 101 is mounted on the belt unit 41, the limiting member 105 is demounted from the core 300 and then is mounted again on the rotation locus limiting member 104 to be placed in the mounted state (first state). Then, the core 300 is disengaged from the belt unit 41. Thus, in a state in which the belt unit 41 is mounted on the fixing unit 40, the fixing belt replacing operation is ended.

Modified Embodiment 1

In the above-described embodiment, the image heating apparatus using the ceramic heater as the heating source is described but a heating type in the present invention is not limited thereto. That is, the image heating apparatus may also be an image heating apparatus in which the fixing belt includes an electromagnetic induction heat generating layer and is heated by an electromagnetic induction heating source, or an image heating apparatus in which the fixing belt includes a heat generating layer for generating heat by supply of electric power and is heated by a power source, as the heating source, for applying a voltage between electrodes.

Modified Embodiment 2

In the above-described embodiment, the member for sliding the fixing belt 101 in the longitudinal direction by pushing the rear end portion of the fixing belt 101 is used as the limiting member 105 but another member may also be used.

Modified Embodiment 3

In the above-described embodiment, the pressing roller is used as the pressing member, but the present invention is not limited thereto. In place of the pressing roller, it is also possible to use a pressing belt.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 126844/2012 filed Jun. 4, 2012, which is hereby incorporated by reference.

What is claimed is:

1. A replacement belt unit for use with an image heating apparatus which includes an endless belt configured to heat an image on a recording material at a nip, a rotatable member configured to form the nip between itself and the endless belt and rotate for rotating the endless belt by rotation thereof, and a holding member configured to hold the endless belt at an inside of the endless belt, said replacement belt unit comprising:
   a replacement endless belt;
   a cylindrical member configured to support said replacement endless belt at an inner surface of said replacement endless belt; and
   an engaging portion provided in a longitudinal end side of said cylindrical member and configured to engage the holding member so that said cylindrical member is maintained in a fixed state relative to the holding member when said replacement endless belt supported on said cylindrical member is fitted around the holding member.

2. A replacement belt unit according to claim 1, wherein said cylindrical member includes a plurality of ribs formed along its longitudinal direction at different positions on its outer peripheral surface.

3. A replacement belt unit according to claim 1, further comprising a protective sheet for protecting the replacement endless belt.

4. A replacement belt unit according to claim 1, wherein the image heating apparatus includes a limiting member, provided on the holding member in a detachable state, configured to limit movement of the endless belt in a longitudinal direction of the endless belt, and
   wherein said cylindrical member includes a guiding portion configured to guide sliding movement of the limiting member, detached from the holding member, relative to said cylindrical member by an engagement with the limiting member.

5. A replacement belt unit according to claim 1, wherein said engaging portion is provided at each of a central position and a decentered position spaced from the central position in the longitudinal end side of said cylindrical member.

6. A belt replacing method for an image heating apparatus which includes an endless belt configured to heat an image on a recording material at a nip, a rotatable member configured to form the nip between itself and the endless belt and for rotating the endless belt by rotation thereof, and a holding member configured to hold the endless belt from an inside of the endless belt, said belt replacing method comprising:
   a step of pulling out the endless belt from the holding member;
   a step of engaging a replacement belt unit with the holding member;
   a step of sliding a replacement endless belt in the replacement belt unit toward the holding member; and
   a step of disengaging the replacement belt unit from the holding member.

7. A belt replacing method according to claim 6, further comprising a step of moving, before said step of pulling out the endless belt from the holding member, the holding member away from the rotatable member in a longitudinal end side of the holding member more than in another longitudinal end side of the holding member.

8. A belt replacing method according to claim 7, further comprising a step of demounting, before said step of pulling out the endless belt from the holding member, a limiting member which limits movement of the endless belt in a longitudinal direction of the endless belt.

9. A belt replacing method according to claim 8, further comprising a step of engaging the limiting member, demounted from the holding member, with the replacement belt unit,
   wherein the limiting member is slid and moved relative to the replacement belt unit and thus the replacement endless belt is slid and moved from the replacement belt unit to the holding member.

10. A belt replacing method according to claim 9, further comprising a step of mounting the limiting member on the holding member after the replacement endless belt is slid and moved from the replacement belt unit to the holding member.

11. A replacement belt unit for use with an image heating apparatus which includes an endless belt configured to heat an image on a recording material at a nip, a rotatable member configured to form the nip between itself and the endless belt and for rotating the endless belt by rotation thereof, and a guiding member configured to guide rotational movement of the endless belt from an inside of the endless belt, said replacement belt unit comprising:
   a replacement endless belt;
   a cylindrical member configured to support said replacement endless belt at an inner surface of said replacement endless belt; and
   an engaging portion provided in a longitudinal end side of said cylindrical member and configured to engage the guiding member so that said cylindrical member is maintained in a fixed state relative to the guiding member when said replacement endless belt supported on said cylindrical member is fitted around the guiding member.

12. A replacement belt unit according to claim 11, wherein said cylindrical member includes a plurality of ribs formed along its longitudinal direction at different positions on its outer peripheral surface.

13. A replacement belt unit according to claim 11, further comprising a protective sheet for protecting the replacement endless belt.

14. A replacement belt unit according to claim 11, wherein the image heating apparatus includes a limiting member, provided on the holding member in a detachable state, configured to limit movement of the endless belt in a longitudinal direction of the endless belt, and
   wherein said cylindrical member includes a guiding portion configured to guide sliding movement of the limiting member, detached from the guiding member, relative to said cylindrical member by an engagement with the limiting member.

15. A replacement belt unit according to claim 11, wherein said engaging portion is provided at each of a central position and a decentered position spaced from the central position in the longitudinal end side of said cylindrical member.

16. A belt replacing method for an image heating apparatus which includes an endless belt configured to heat an image on a recording material at a nip, a rotatable member configured to form the nip between itself and the endless belt and rotate the endless belt by rotation thereof, and a guiding member configured to guide rotation of the endless belt from an inside of the endless belt, said belt replacing method comprising:
   a step of pulling out the endless belt from the guiding member;
   a step of engaging a replacement belt unit with the guiding member;

a step of sliding a replacement endless belt in the replacement belt unit toward the guiding member; and a step of disengaging the replacement belt unit from the guiding member.

17. A belt replacing method according to claim 16, further comprising a step of moving, before said step of pulling out the endless belt from the guiding member, the guiding member away from the rotatable member in a longitudinal end side of the guiding member more than in another longitudinal end side of the guiding member.

18. A belt replacing method according to claim 17, further comprising a step of demounting, before said step of pulling out the endless belt from the guiding member, a limiting member which limits movement of the endless belt in a longitudinal direction of the endless belt.

19. A belt replacing method according to claim 18, further comprising a step of engaging the limiting member, demounted from the guiding member, with the replacement belt unit, wherein the limiting member is slid and moved relative to the replacement belt unit and thus the replacement endless belt is slid and moved from the replacement belt unit to the guiding member.

20. A belt replacing method according to claim 19, further comprising a step of mounting the limiting member on the guiding member after the replacement endless belt is slid and moved from the replacement belt unit to the guiding member.

\* \* \* \* \*